(12) United States Patent
Gillay

(10) Patent No.: US 7,909,684 B2
(45) Date of Patent: Mar. 22, 2011

(54) AUTOMOTIVE FRONT POST GARNISH WITH INTEGRAL DEFROSTER DUCT

(75) Inventor: Daniel F. Gillay, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/769,861

(22) Filed: Jun. 28, 2007

(65) Prior Publication Data
US 2009/0004960 A1  Jan. 1, 2009

(51) Int. Cl.
*B62D 25/14* (2006.01)
(52) U.S. Cl. .......................... 454/127; 454/121
(58) Field of Classification Search .................. 454/127, 454/121
See application file for complete search history.

(56) References Cited

U.S. PATENT DOCUMENTS

| | | |
|---|---|---|
| 3,780,640 A | 12/1973 | Fruth |
| 4,345,510 A | 8/1982 | Sterett |
| 4,577,836 A | 3/1986 | Guillemin et al. |
| 4,583,448 A | 4/1986 | Sasaki et al. |
| 5,397,267 A | 3/1995 | Vecellio et al. |
| 6,409,590 B1 * | 6/2002 | Suzuki et al. ................. 454/143 |
| 6,527,013 B2 * | 3/2003 | Somerville et al. ........... 138/148 |
| 2004/0102152 A1 * | 5/2004 | Kawahigashi ................ 454/121 |

* cited by examiner

*Primary Examiner* — Steven B McAllister
*Assistant Examiner* — Samantha A Miller
(74) *Attorney, Agent, or Firm* — Gifford, Krass, Sprinkle, Anderson & Citkowski, P.C.

(57) ABSTRACT

A molded plastic garnish assembly (10) for a front post of an automotive vehicle, the garnish assembly having a duct portion (16) integrally molded with an overlying portion (18) that has a vent opening (14) therein. The duct portion and the overlying portion are molded together in alignment and are subsequently brought into overlying relationship by bending them relative to one another about a molded-in hinge (20). The duct portion and the overlying portion are secured to one another by engagement of a hook portion (22) at the end of a finger (24) that depends from the overlying portion into an opening (26) in a finger (28) that depends from the duct portion.

4 Claims, 4 Drawing Sheets

AUTOMOTIVE FRONT POST GARNISH WITH INTEGRAL DEFROSTER DUCT

FIELD OF THE INVENTION

This invention relates to a garnish assembly for a front post of an automotive vehicle. More particularly, this invention relates to a garnish assembly of the foregoing character with an integral duct to deliver defroster fluid to a vent opening in the garnish itself.

BACKGROUND OF THE INVENTION

A typical automotive vehicle has a garnish to cover each front post of the vehicle, a garnish on the driver's side and a separate garnish on the passenger side. Each front post, which is often called the A post, separates the windshield from the adjacent side window. Typically, each garnish has a vent opening therein to discharge defroster fluid from the vehicle defroster against the adjacent side window and must have a defroster duct attachment on the inside of the garnish to receive a free or distal end of a conduit that is a part of the defroster ductwork. Such a two-piece garnish assembly requires the expense of molding separate pieces and the subsequent assembly of the separate pieces to one another before the assembly itself can be attached to the associated vehicle, as well as separate molds to mold the separate pieces.

SUMMARY OF THE INVENTION

According to the present invention there is provided a molded plastic garnish for a front post of an automotive vehicle, the garnish having a defroster duct receiving element molded integrally therewith in a single piece. The garnish and duct receiving elements are molded in a single piece in hinged alignment with one another, and are subsequently assembled by bending the garnish and the duct receiving element relative to one another to form a duct opening in the garnish to receive a free or distal end of a defroster fluid delivery duct to flow through outlet passages in the garnish against an adjacent front side window. This technique eliminates the need for separately molding garnish and duct receiving elements in separate molds as well as the assembly step needed to properly assemble the separate pieces to one another.

DETAILED DESCRIPTION OF THE INVENTION

Figure 1:
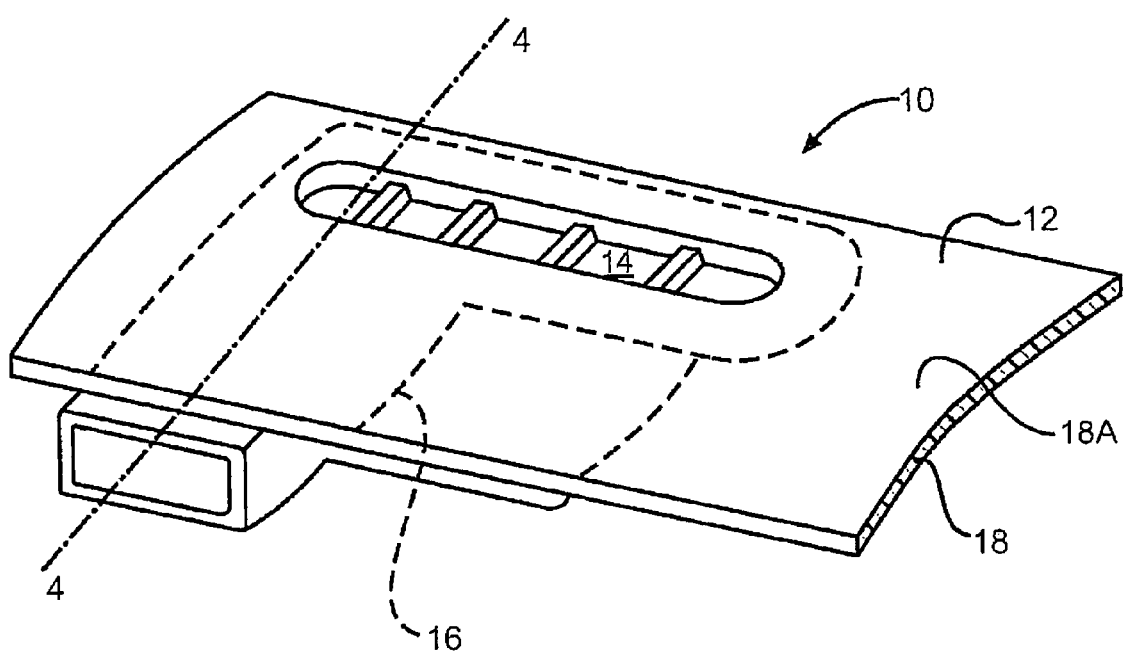
FIG. 1 is a fragmentary perspective view of an automotive front post garnish with an integral defroster duct according to the preferred embodiment of the present invention.

A front post garnish with an integral defroster duct is indicated generally by reference numeral 10 in FIG. 1. The garnish with an integral duct 10 has a surface 12 that faces into the passenger compartment of the associated vehicle, with a vent opening 14 therein. The vent opening 14 receives warm fluid through an integral duct portion 16, also referenced herein as the underlying portion. The underlying portion 16 is formed integrally in a single piece with an overlying portion 18 of the combined garnish and duct 10, and the vent opening 14 is positioned to discharge fluid against an adjacent side window (not shown). The overlying portion 18 includes a visible surface 18a. The visible surface 18a is visible from the passenger compartment of the vehicle (not shown). The underlying portion 16 includes a hidden surface 16b opposite the visible surface 18a.

Figure 2:
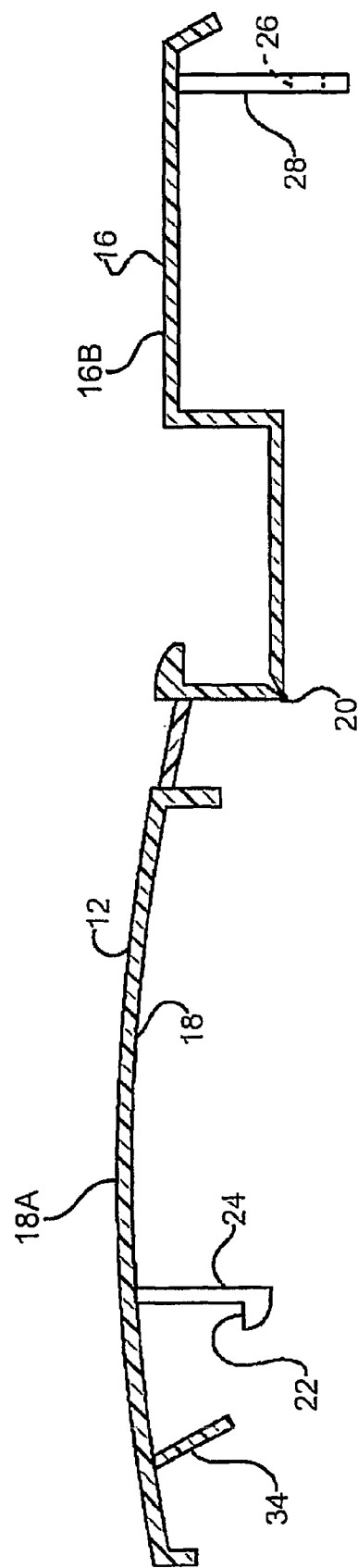
FIG. 2 is a cross-sectional view, at an enlarged scale, of a molded plastic element from which the garnish with an integral duct receiving element according to FIG. 1 may be formed.
Figure 3:
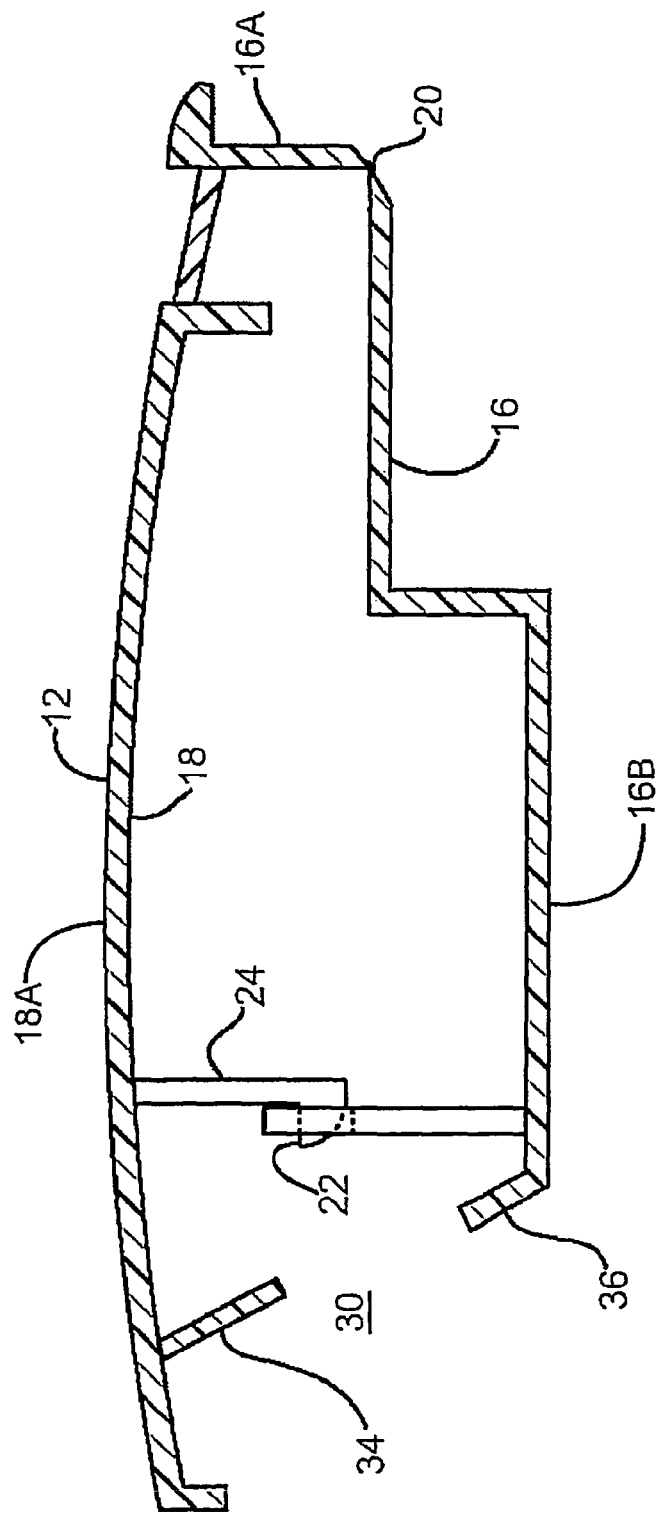
FIG. 3 is a view like FIG. 2 showing the molded plastic element of FIG. 2 after its aligned portions have been folded into assembled relationship relative to one another.

The overlying portion 18 and the underlying portion 16 are molded in a single piece from a suitable thermoplastic material, such as polypropylene, in the form shown in FIG. 2. One of either the overlying portion 18 or underlying portion 16 includes an inwardly and downwardly extending first elongated member 24, and the other of either the overlying portion 18 or underlying portion 16 includes an upwardly and inwardly extending second elongated member 28. The first elongated member 24 includes a male portion 22 and the second elongated member 28 includes a female portion 26. The duct and the overlying portions 18, 16 are then folded relative to each other about an integral, molded-in hinge 20, also referenced herein as a weakening seam, as shown in FIG. 3.

Figure 4:
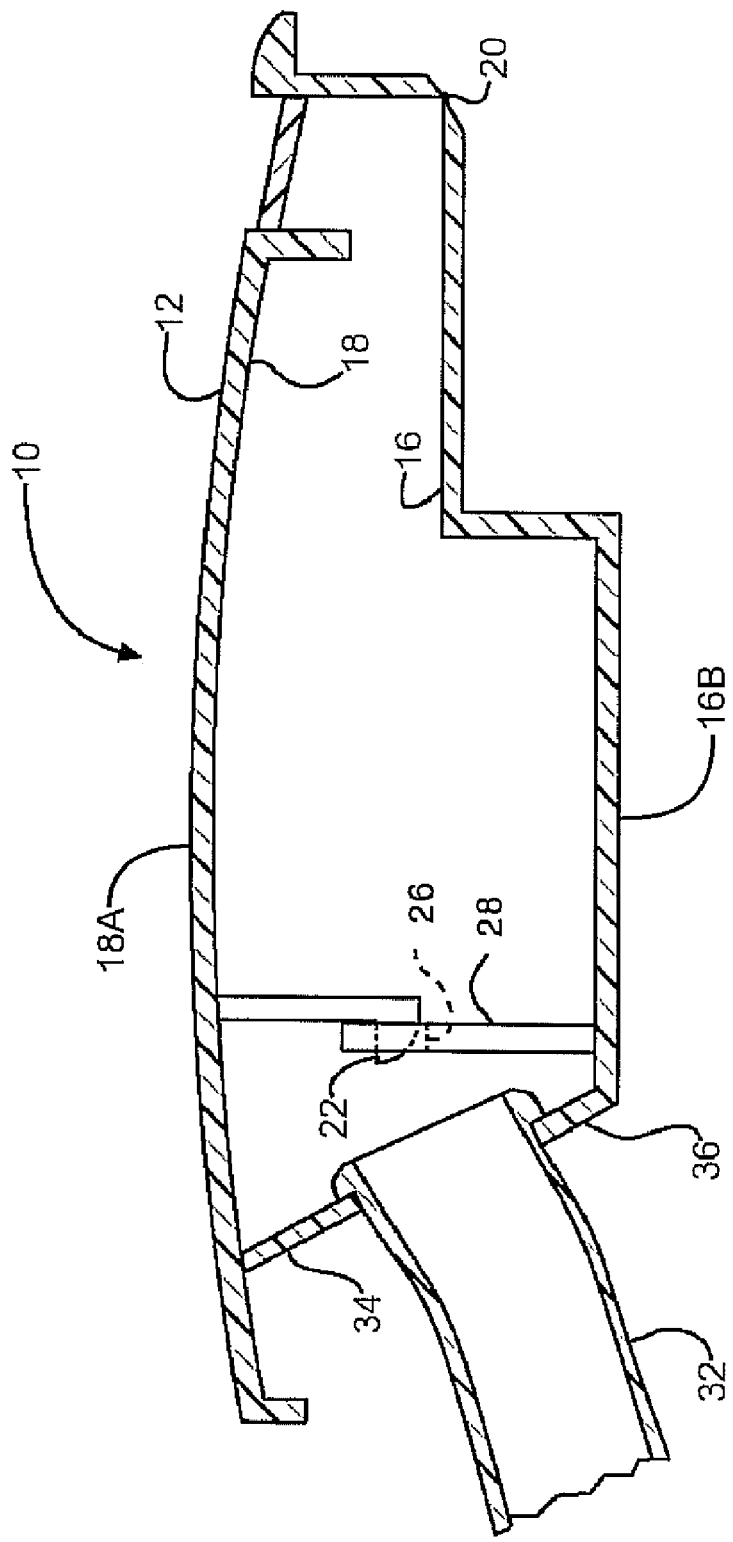
FIG. 4 is a sectional view taken on line 4-4 of FIG. 1, with a separate element added to the version shown in FIG. 1.

In a first preferred embodiment, the first elongated member and second elongated members are 24, 28 are fingers, the male portion 22 is a hook portion, and the female portion 26 is an opening. The overlying portion 18 is folded about the weakening seam 20 to positions where the hook portion 22 of the finger 24 that extends downwardly and inwardly from the overlying portion 18 engages the opening 26 in the finger 28 that extends upwardly and inwardly from the portion 16. The memory remaining in the portion 18 and in the portion 16 from having been molded in alignment serves to prevent the portion 18 and the portion 16 from moving further toward one another from the position shown in FIG. 3. Thus, as shown in FIG. 4, there is an opening 30, as defined by flanges 34 and 36, in the combined garnish and duct assembly 10. The opening 30 is formed on a side opposite the weakening seam. The opening 30 provides a passage into which a conduit 32 from a defroster system can discharge fluid for flow outwardly from the vent opening 14 of the overlying portion 18.

Outwardly of the hinge 20, the duct portion 16 has a transversely extending portion 16A that, in conjunction with the fingers 24, 26, serves to space the portions 16 and 18 from each other to permit fluid to flow therebetween.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

The invention claimed is:

1. A garnish for a front post of an automotive vehicle, said garnish comprising:

a member having an overlying portion having a visible surface, the visible surface visible from a passenger compartment of the vehicle, an underlying portion having a hidden surface opposite the visible surface, and a weakening seam, said overlying portion including a vent opening therein, wherein said weakening seam is disposed between said underlying portion and said overlying portion, said underlying portion molded in alignment with said overlying portion in position to carry defroster fluid for discharge through said vent opening;

one of said overlying portion or said underlying portion is provided with a first elongated member extending inwardly and towards the other of said overlying portion or said underlying portion, the elongated member having a male portion, the other of said overlying portion or said underlying portion is provided with a second elongated member extending inwardly and toward the one of said overlying portion or said underlying portion, said second elongated member having a female portion; and said male portion being received in said female portion so as to secure said overlying portion and said underlying portion to one another, wherein said overlying portion overlays said underlying portion so as to form a duct when said underlying portion and said overlying portion are folded about said weakening seam, said duct having, an opening on a side opposite the weakening seam, the opening for receiving a distal end of a conduit of an automotive defroster system.

2. A garnish with an integral duct according to claim 1 wherein:

said garnish with an integral defroster duct is molded from a suitable thermoplastic material.

3. A garnish with an integral duct according to claim 2 wherein:

said thermoplastic material is polypropylene.

4. A garnish with an integral defroster duct according to claim 3 wherein:

said underlying portion comprises a transversely extending portion extending outwardly of said weakening seam to space said underlying portion from said overlying portion to thereby provide space to permit defroster fluid to flow therebetween.

* * * * *